June 5, 1928.  
E. ROUCKA  
1,672,039  
AUTOMATIC DRAFT REGULATOR  
Filed Feb. 4, 1925
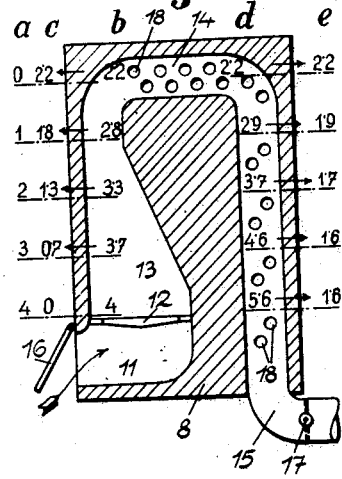
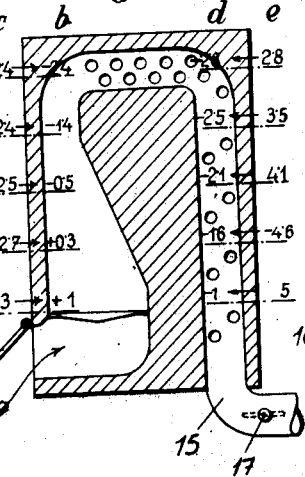
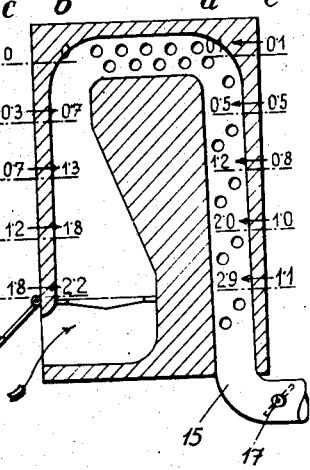
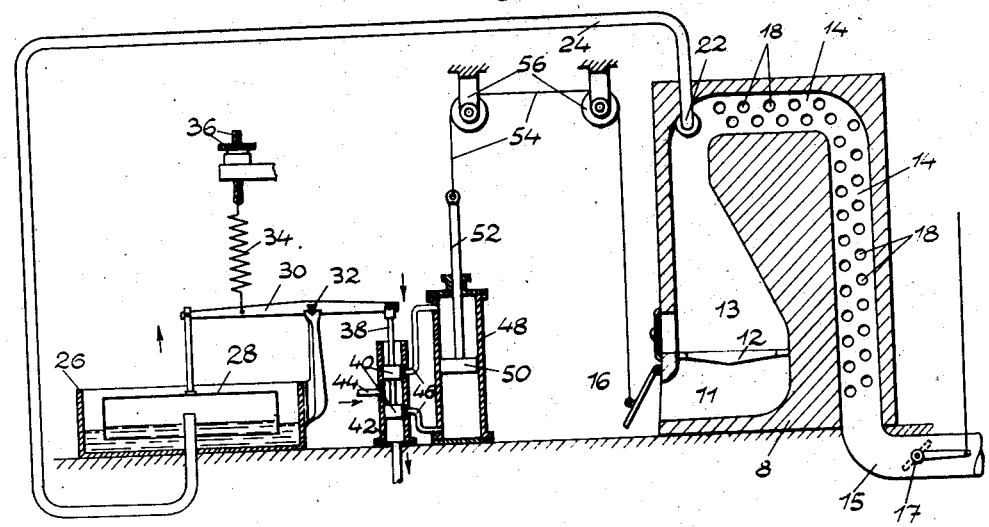
INVENTOR  
ERICH ROUČKA  
BY  
ATTORNEYS.

Patented June 5, 1928.

1,672,039

UNITED STATES PATENT OFFICE.

ERICH ROUČKA, OF BLANSKO, CZECHOSLOVAKIA.

AUTOMATIC DRAFT REGULATOR.

Application filed February 4, 1925, Serial No. 6,763, and in Czechoslovakia February 20, 1924.

This invention relates to draft regulators for furnaces of the natural draft type.

In the operation of known furnaces of this character with known types of draft regulators under small loads, the pressure of the hot gases at a certain point in the flue gas channel or passage to the smoke-stack, usually the highest point, tends to rise to considerably above atmospheric pressure so that said gases leak from the fire-box or flue through cracks in the walls of the upper part of the fire-box, for instance such as caused by cracked or loosely fitting bricks. It is therefore necessary to maintain a small flow of the gases through the furnace large enough to overcome the effect of the escaping gases, and the cold air thus entering the furnace causes unnecessary consumption of the fuel, absorbs heat from the fire and escapes into the smoke-stack with resultant loss or waste of considerable heat and fuel.

One object of the present invention is to provide a novel and improved method and means for so maintaining or regulating the draft of a furnace as to prevent such leakage of the hot gases through cracks in the upper part of fire-box walls when the furnace is operating under a small or light load, whereby the draft through the grate which is ordinarily necessary to replace such escaping gases and which causes otherwise unnecessary burning of fuel, may be eliminated and thereby economical and efficient consumption of fuel ensured.

Another object is to provide such a method and apparatus whereby the draft through the fire-box may be so regulated as to prevent the pressure of the hot gases from rising above atmospheric pressure or pressure of the air in the furnace room or other space in which the furnaces are installed even upon reduction in the draft pressure under a small load on the furnace, so that tendency to leakage of the hot gases from the fire-box and flue is overcome.

Further objects are to provide a method and apparatus of the character described in which the pressure of the draft through the ash-pit is regulated by means controlled by a device sensitive to the pressure of the hot gases at the region in the hot gas channel where the pressure would normally rise highest above atmospheric pressure so that the pressure of the hot gases is maintained at or below atmospheric pressure; to provide such an apparatus including means for varying the natural draft through the furnace, and an automatic regulator for actuating said means and controlled by the hot gas pressure at the top of the hot gas channel whereby the pressure of the hot gases is maintained at or below a predetermined pressure as the load on the furnace decreases, and to obtain other results and advantages as may be brought out by the following description.

In the accompanying drawing I have schematically illustrated a draft regulating apparatus embodying the invention and including certain details of construction, but it will be understood that this is mainly for the purpose of illustrating the principles of the invention and that many modifications and changes may be made in the details of construction without departing from the spirit or scope of the invention.

Referring to said drawings in which the same characters of reference designate corresponding and like parts through the several views, Figures 1—3, inclusive, are schematic vertical sectional views through a water tube boiler illustrating three different draft conditions, and Figure 4 is a schematic illustration of the draft regulating apparatus embodying the invention.

The boiler illustrated in Figures 1–3, inclusive, is shown as including a casing 8 formed with a fire-box 13 at one side thereof provided with a grate 12 beneath which is the usual ash-pit or air inlet passage 11. From the fire-box 13 extends a hot gas passage or channel 14 which is substantially inverted U-shaped in cross-section and terminates at its end opposite the fire-box in a flue 15 which leads to a smoke-stack (not shown). Water tubes 18 extend transversely of the hot gas passage or channel 14 so that the heat from the hot gases passing through said channel is transferred to the water in the tubes. These tubes are only diagrammatically illustrated, and it will be understood that any suitable construction and arrangement could be utilized. The draft through the ash-pit 11 is controlled by a door or damper 16, while the flow of gases of combustion from the flue 15 to the smoke-stack is controlled by a damper 17 which may be controlled either manually or by an automatic regulator. With this arrangement, the draft through the ash-pit 11 and fire-box 13 may be varied or regulated according to the load on the furnace, for instance by opening or closing of the damper 17, or by the ash-pit damper 16.

It is a well-known fact that the pressures of the hot gases passing through the channel 14 vary under different drafts, said pressures, in some cases, particularly under small loads, rising above atmospheric pressure, that is pressure outside of the furnace, so that there is a tendency of said gases to escape through cracks in the upper parts of the fire-box walls or the passage 14. Under other conditions, for instance with the furnace operating under full load, the pressures of the hot gases are below atmospheric pressure, in other words, a partial vacuum exists in the passage or channel 14.

In order briefly to obtain an understanding of the draft condition which the present invention is provided to correct, we may assume that the pressure of the air outside the boiler, that is, atmospheric pressure, is 0 on a metric water column, as indicated in column $a$. We may further assume that at every metre vertically downward on the column from the top of the hot gas channel 14 to the grates 12, the pressure increases approximately 1.16 mm. metric water column, which represents the weight of a column of air one metre high and one square centimetre in cross-section. For simplicity, the column $a$ is graduated from 0-4 to indicate the pressures outside the boiler at the levels of the various graduations. Further supposing an extraordinary condition which is impossible in practice, with the damper 17 fully closed and the hot gases remaining at approximately a constant temperature, the pressure of the hot gases inside the fire-box at the level of the grate would be the same as the pressure outside the boiler at the same level, that is, 4 mm. At the level corresponding to the outside pressure 3 mm. the pressure inside the fire-box would be lower by about 0.3 mm. which is the weight of extremely hot gases of combustion. Thus the inside pressure would be 3.7 mm. The inside pressures are indicated in the columns $b$ and $d$, and it is obvious from the drawing that the inside pressures from the grates to the top of the passage 14 are in excess of the outside pressure, while the pressures from the top of the passage 14 to the flue 15 are also in excess of the outside pressure. These latter pressures are indicated in the column $d$. The amounts which the inside pressures exceed the corresponding outside pressures are indicated in the columns $c$ and $e$, and it will be obvious that the hot gases will thus tend to leak or escape through cracks in the fire-box walls in the directions indicated by the arrows.

In Figure 2 are illustrated the draft conditions when the furnace is operating under full load with the damper 17 fully open. The hot gases of combustion escaping through the flue 15 to the smoke-stack past the damper 17 reduce the pressures in the hot gas channel 14, so that the inside pressure of the fire-box at the level of the grates is now 1 mm. which is 3 mm. lower than the corresponding outside pressure. All of the inside pressures are greatly reduced below the outside pressure, as indicated in the respective columns $a$, $b$, $c$, $d$ and $e$, so that there is no tendency of the hot gases to escape from the fire-box, and the extent of the partial vacuum varies according to the various points in the length of the channel 14 at which the pressures are taken. It is obvious that the conditions shown in Figures 1 and 2 are opposite extremes, and that between these two conditions are a large number of other varying conditions.

In Figure 3 is illustrated a setting of the dampers 16 and 17 and a condition of the hot gases drafts wherein the pressure of the channel 14 is equal to atmospheric pressure. All of the other pressures inside the fire-box and channel 14 are below corresponding outside pressures so that there is no tendency of the hot gases to escape through the walls of the fire-box.

Obviously, an increase of the load on the furnace could not result in the creation of any pressures of the hot gases in excess of the outside pressure, but upon a falling off of the load, for instance by closing the damper 17, the pressures of the hot gases will tend to rise above atmospheric, as illustrated in Figure 1. It is therefore necessary to provide for a small flow of the hot gases through the channel 14 and flue 15 to overcome the effects of the escape of the hot gases through the fire-box walls, and this results in unnecessary consumption of the fuel on the grate 12 and a waste of heat which is absorbed by the incoming cold air which must be heated to the temperature of the fire-box before it passes outwardly through the flue 15. It is the purpose of the invention to overcome this difficulty and to regulate the draft through the ash-pit or by the damper 17 in accordance with the pressure of the hot gases at the top of the channel 14, so as to prevent the rising of the pressures of the hot gases above atmospheric.

One manner of carrying out the invention is illustrated in Figure 4 of the drawings, in which the damper 16 is controlled by an automatic regulator which is in turn controlled by the pressure of the hot gases at the top of the channel 14. The damper 16 is connected to one end of a cable 54 which passes over pulleys 56 on a fixed support and to the other end of which is connected the piston rod 52 of a piston 50 arranged in a cylinder 48 of a fluid motor. Movement of the piston 50 is controlled by a fluid governor including a valve piston 40 arranged in a cylinder 42, said valve piston serving to control the flow of fluid under pressure from a supply pipe 44 to and from the cylinder 48 through pipes 46. The valve piston 40 is connected to one end of a beam 30 pivotally mounted intermediate its ends as at 32 on a fixed support. The other end of the beam 30 is pivotally connected to an inverted bell float 28 having its edges submerged in a liquid in a container 26. The interior of the bell 28 communicates through a tube 24 and connection 22 with the top of the hot gas channel 14, so that the bell 28 is sensitive to the pressure of the hot gases at the point in the channel 14 where the device 22 is arranged. One end of a tension spring 34 is connected to the beam 30 at the same side of the fulcrum 32 as the bell 28, the other end of said spring being connected to an adjusting screw 36 mounted in a fixed support. With this construction it will be observed that upon a rise in the pressure of the hot gases at the point 22, the bell 28 will be raised and actuate the beam 30 to move the valve piston 40 so as to permit flow of fluid from the supply pipe 44 into the lower end of the cylinder 48, whereupon the piston 50 is moved upwardly to permit closing the damper 16 by action of gravity. Upon a decrease in the pressure of the hot gases in the channel 14 at the point 22, the reverse action takes place, the piston 50 being actuated to open the damper 16. By varying the tension of the spring 34, the apparatus may be so regulated as to close and open the damper 16 upon certain predetermined pressures at the point 22 in the channel 14.

In the operation of the apparatus, when the furnace is carrying a normal load or an overload, the damper 16 is fully opened and the pressure of the hot gases is considerably lower than that necessary to operate the regulator to close the damper 16. Upon a falling off of the load, as by closing the damper 17, the pressure of the hot gases rises and when a certain pressure predetermined by the tension of the spring 34, is reached, the regulator operates to partially close the damper 16. This action causes a reduction of the pressure in the ash-pit 11 which affects all the pressures in channel 14 until the pressure of the hot gases at the point 22 has decreased to below the predetermined pressure, for instance 0.2 mm. water column. Upon a further decrease in the load on the furnace the same action takes place, while upon an increase in the load the pressure of the hot gases falls so as to cause actuation of the regulator to fully open the damper 16.

It will be understood that another type of regulator than 26—56 may be utilized, and that the regulator could be used for operation of the damper 17 instead of the damper 16. It should be clear that the draft through the fire-box is governed by the pressure of the hot gases at the point where such pressure normally would rise highest above atmospheric upon a falling off of the load; as illustrated on the drawings, this point is usually the upper part of the first draft channel.

Having thus described the invention, what I claim is:

1. The method of regulating natural draft furnaces including an ash-pit damper and a flue damper, consisting in governing the closing and opening of one of said dampers in accordance with the rise and fall in the pressure of the hot gases at the point between the fire and the flue where said pressure tends to rise highest when the furnace is operating under a smaller than normal load to prevent said pressure of the hot gases rising above a predetermined degree.

2. The method of regulating natural draft furnaces including an ash-pit damper and a flue damper, consisting in governing the closing and opening of one of said dampers in accordance with the rise and fall above or below a predetermined degree in the pressure of the hot gases at the highest point in the passage between the fire and the flue.

3. The method of regulating natural draft furnaces including an ash-pit damper and a flue damper, consisting in governing the closing and opening of said ash-pit damper in accordance with the rise and fall respectively of the pressure of the hot gases at the point between the fire and the flue where said pressure tends to rise highest above atmospheric when the furnace is operating at a certain rate of combustion.

4. The combination with a natural draft furnace having a fire-box, and a hot gas channel for utilizing heat, of a draft controlling means, and pressure sensitive means for actuating said draft controlling means responsive to the static pressure of the gases in said hot gas channel at the point where said pressure tends to rise highest above atmospheric when the furnace is operating under a smaller than normal load.

5. A natural draft furnace system, comprising a fire-box, an ash-pit, a hot gas channel for utilizing heat, means for controlling the outflow of flue gases, means for controlling the pressure drop between said ash-pit and the atmosphere; and an automatic regulator for controlling the second mentioned means actuated by the pressure of the hot gases at the point in said hot gas channel where said pressure tends to rise highest above atmospheric when the furnace is operating under a smaller than normal load to prevent such rising of said pressure of said hot gases above a predetermined degree while the furnace is operating under a smaller than normal load.

6. A natural draft furnace system, comprising a fire-box, an ash-pit, a hot gas channel for utilizing heat, means for controlling the outflow of flue gases, means for controlling the pressure drop between said ash-pit and the atmosphere, a pressure sensitive automatic regulator for controlling the second-mentioned means, and a tube for transmitting the pressure of the hot gases at the top of said hot gas channel to said regulator, whereby said second-mentioned means is closed or opened respectively in accordance with a rise or a fall of said pressure of said hot gases above or below a predetermined degree.

7. A natural draft furnace system, comprising a fire-box, an ash-pit, a hot gas channel for utilizing heat, means for controlling the outflow of flue gases, means including a passage in the wall between the ash pit and the furnace room and a damper in said passage for controlling the pressure drop between said ash-pit and the furnace room, and means responsive to the pressure of the gases in said hot gas channel for actuating said damper to control said pressure drop and prevent rising of the pressure of said gases above the pressure in the furnace room.

ERICH ROUČKA.